(12) United States Patent
Grant et al.

(10) Patent No.: US 10,128,491 B2
(45) Date of Patent: *Nov. 13, 2018

(54) METHOD FOR ALKALIATING ELECTRODES

(71) Applicant: Nanoscale Components, Inc., Hudson, NH (US)

(72) Inventors: Robert W. Grant, Camden, ME (US); Matthew Sweetland, Bedford, MA (US); Asela Maha Acharige, Old Town, ME (US)

(73) Assignee: Nanoscale Components, Inc., Hudson, NH (US)

( * ) Notice: Subject to any disclaimer, the term of this patent is extended or adjusted under 35 U.S.C. 154(b) by 602 days.

This patent is subject to a terminal disclaimer.

(21) Appl. No.: 14/590,573

(22) Filed: Jan. 6, 2015

(65) Prior Publication Data

US 2015/0191841 A1 Jul. 9, 2015

Related U.S. Application Data

(63) Continuation-in-part of application No. 13/688,912, filed on Nov. 29, 2012, now Pat. No. 9,598,789.

(60) Provisional application No. 61/565,580, filed on Dec. 1, 2011, provisional application No. 61/662,115, filed on Jun. 20, 2012.

(51) Int. Cl.
*H01M 4/04* (2006.01)
*H01M 4/139* (2010.01)
*H01M 4/1393* (2010.01)
*H01M 10/052* (2010.01)
(Continued)

(52) U.S. Cl.
CPC ......... *H01M 4/139* (2013.01); *H01M 4/0459* (2013.01); *C25D 7/0614* (2013.01); *H01M 4/0404* (2013.01); *H01M 4/1393* (2013.01); *H01M 10/052* (2013.01); *H01M 10/0525* (2013.01)

(58) Field of Classification Search
CPC .................................................. C25D 7/0614
See application file for complete search history.

(56) References Cited

U.S. PATENT DOCUMENTS

| 2,943,033 A | 6/1960 | Blue et al. |
| 3,994,789 A | 11/1976 | Langer et al. |

(Continued)

FOREIGN PATENT DOCUMENTS

| JP | 07-176323 | 7/1995 |
| JP | 09-022690 | 1/1997 |

(Continued)

OTHER PUBLICATIONS

Whittingham, M. S., "Lithium Batteries and Cathode Materials," Chemical Reviews, 104(10): 4271-4301 (2004).

(Continued)

*Primary Examiner* — Stefanie S Wittenberg
(74) *Attorney, Agent, or Firm* — Elmore Patent Law Group, P.C.; Carolyn S. Elmore; Darlene A. Vanstone

(57) ABSTRACT

The present invention relates to a method for lithiation of an intercalation-based anode or a non-reactive plating-capable foil or a reactive alloy capable anode, whereby utilization of said lithiated intercalation-based anode or a plating-capable foil or reactive alloy capable anode in a rechargeable battery or electrochemical cell results in an increased amount of lithium available for cycling, and an improved reversible capacity during charge and discharge.

18 Claims, 8 Drawing Sheets

(51) Int. Cl.
*H01M 10/0525* (2010.01)
*C25D 7/06* (2006.01)

(56) References Cited

U.S. PATENT DOCUMENTS

| | | |
|---|---|---|
| 4,263,117 A | 4/1981 | Pignan et al. |
| 4,853,304 A | 8/1989 | Ebner et al. |
| 4,919,911 A | 4/1990 | Shirota et al. |
| 5,069,683 A | 12/1991 | Fong et al. |
| 5,436,093 A | 7/1995 | Huang et al. |
| 5,516,602 A | 5/1996 | Uemichi |
| 5,595,837 A | 1/1997 | Olsen et al. |
| 5,721,067 A | 2/1998 | Jacobs et al. |
| 5,743,921 A | 4/1998 | Nazri et al. |
| 5,753,388 A | 5/1998 | Koksbang et al. |
| 5,759,715 A | 6/1998 | Barker et al. |
| 6,022,643 A | 2/2000 | Lee et al. |
| 7,276,314 B2 | 10/2007 | Gao et al. |
| 8,021,496 B2 | 9/2011 | Yakovleva et al. |
| 2003/0138703 A1 | 7/2003 | Yamaguchi et al. |
| 2003/0170547 A1 | 9/2003 | Kim et al. |
| 2004/0265685 A1 | 12/2004 | Popov et al. |
| 2008/0032192 A1 | 2/2008 | Yokomizo et al. |
| 2008/0073217 A1 | 3/2008 | Takezawa |
| 2008/0206641 A1 | 8/2008 | Christensen et al. |
| 2009/0288856 A1 | 11/2009 | Sandoval et al. |
| 2010/0047695 A1 | 2/2010 | Smart et al. |
| 2010/0297509 A1 | 11/2010 | Okumura et al. |
| 2011/0195293 A1 | 8/2011 | Grant et al. |
| 2011/0226987 A1 | 9/2011 | Yakovleva et al. |

FOREIGN PATENT DOCUMENTS

| | | |
|---|---|---|
| JP | 2003091021 A | 3/2003 |
| JP | 2008-016199 | 1/2008 |
| JP | 2008-078199 | 4/2008 |
| JP | 2010-238451 | 10/2010 |
| WO | 2008/026595 A1 | 3/2008 |

OTHER PUBLICATIONS

Rauh, R. D., et al., "The Effect of Additives on Lithium Cycling in Propylene Carbonate," Electrochimica Acta, 22: 75-83 (1977).

Selim, R., et al., "Some Observations on Rechargeable Lithium Electrodes in a Propylene Carbonate Electrolyte," Journal of the Electrochemical Society, 121(11): 1457-1459 (1974).

Koch, V. R., et al., "The Stability of the Secondary Lithium Electrode in Tetrahydrofuran-Based Electrolytes," Journal of the Electrochemical Society, 125(9): 1371-1377 (1978).

METHOD FOR ALKALIATING ELECTRODES

RELATED APPLICATIONS

This application is a continuation-in-part of U.S. application Ser. No. 13/688,912, filed on Nov. 29, 2012 which claims the benefit of U.S. Provisional Application No. 61/662,115, filed on Jun. 20, 2012 and U.S. Provisional Application No. 61/565,580, filed on Dec. 1, 2011. The entire teachings of the above applications are incorporated herein by reference.

BACKGROUND OF THE INVENTION

In the field of rechargeable batteries or electrochemical cells where metal ions are shuttled between cathode and anode at varying voltages, the initial source of metal ions (usually alkali metal) is typically the cathode material. An example of said metal ions includes lithium.

During the initial cycling of a lithium ion rechargeable battery, passivation films are formed on the anode and cathode, but particularly on the negative electrode. As shown in FIG. 1, several reactions can take place as this film is formed on the negative electrode, including solvent reduction, salt reduction, insoluble product formation, and polymerization. The passivation film is often referred to as an SEI layer (solid electrolyte interphase), the formation of which results in the loss of metal ions through an irreversible reaction, as well as a significant loss in battery capacity. Most often, lithium ion batteries are described as having an irreversible initial loss of 10 to 30%. A second type of irreversible loss of metal ions (e.g. lithium+) is due to side reactions that occur during the "shuttling" of metal ions during each additional charge and discharge cycle of the metal ion battery. A third type of irreversible loss is represented by a cathode passivation layer formation composed of soluble and insoluble lithium salts.

Precautions are taken to limit all types of irreversible losses (SEI, cathode passivation layer, and side reactions during long cycling). It would be advantageous, however, if a source could be provided to compensate for the excess metal ion requirement, in an amount necessary to support long cycle life. In most commercial metal ion battery systems, this reserve is provided by the cathode, and therefore the cathode must necessarily be sized to be about 135 to 150% of the specified discharge capacity of the battery, thus increasing the total weight of the battery. Once the irreversible loss of metal ions related to SEI and cathode passivation layer formation is complete, up to 30% of the cathode's metal-donating material has become "dead weight", or non-operating material. Examples of these heavy and expensive cathode materials are $LiFePO_4$, $LiMn_2O_4$, etc.

There have been attempts to source lithium metal to the anode during the construction of the anode. For example, FMC Corporation (Philadelphia, Pa.) has developed a stabilized lithium source called stabilized lithium metal powder, or SLMP (U.S. Pat. No. 8,021,496). This material can be mixed into carbon before an activation step, such as crushing or dissolving by the electrolyte (U.S. Pat. No. 7,276,314). However, SLMP is a very expensive lithium source compared to even common cathode donating materials, and may be difficult to distribute evenly. Dendrites may be enabled by un-dissolved lithium particles causing catastrophic shorts to develop.

Another example of sourcing metal to the anode is found in Li/polymer batteries, where Li metal is placed on a current collector to form an anode containing all the required overcapacity. The coulombic efficiency of this approach, however, is low when compared to the graphite anode based gel or liquid electrolyte battery approach. Furthermore, while the specific capacity is the highest possible, the cost of lithium metal foil is fairly high and the discharge rates for the necessary solid polymer electrolytes are low.

Others have attempted to increase the amount of alkali metal that is available during charge/discharge of an electrochemical cell using a process called pre-lithiation, first charging, or pre-charging, wherein a passivation film is either chemically or electrochemically formed on the anode prior to final assembly of the battery (U.S. Pat. No. 5,595,837; U.S. Pat. No. 5,753,388; U.S. Pat. No. 5,759,715; U.S. Pat. No. 5,436,093; and U.S. Pat. No. 5,721,067). In the cases where electrochemical pre-lithiation was conducted, either a lithium-containing electrode (most often consisting of elemental lithium metal), or a lithium foil was employed as the source of lithium. An alternate process that circumvents the formation of a passivation film, and thus the need to use pre-lithiation, is disclosed in U.S. Pat. No. 5,069,683.

SUMMARY OF THE INVENTION

The present invention relates to the discovery of an improved process for lithiating (and/or alkaliating) a material, such as electrodes, specifically anodes or cathodes over known commercial processes. The novel processes overcome problems in the prior art by providing a good electrochemical process that is roll to roll compatible with current assembly methods, can use inexpensive Li bearing salts with good to excellent efficiency, particularly when used in combination with non-aqueous solvents that do not react with the material, (e.g., anode or cathode) during lithiation. Preferred non-aqueous solvents dissolve and do not ionize the lithium salts, match the desired electrochemical window, or are substantially inert to the anode binder material. Preferred solvents possess a boiling point distant to that of water. A solvent or solvent condition that would meet all of the criteria including salt solubility, ionic conductivity, electrochemical window, and ease of water separation is preferred.

Although several lithium bearing salts can be used in electrolysis, only the least expensive such as LiCl, LiBr, LiF, and $LiNO_3$ for non-limiting examples are preferred for low cost production. Until now, there has been no process that would allow these types of salts to be used as feedstock in the production of battery electrodes (anodes or cathodes). Until now, 30% efficiency would have been the limit using non-aqueous solvents, making production too costly. A satisfactory refinement process has not been found to produce low moisture, pure solvent/salt solutions. Compounds formed by side reactions will eventually interfere with the formation of a successful SEI layer; only insoluble SEI material is desirable (usually formed in the complete battery cell), while these typical electrolysis byproducts are not. Until now, a continuous refinement process has not been found, making it impractical to pre-lithiate battery or electrochemical cell anodes using salt as a feedstock. For the purpose of eliminating the mentioned limitations and creating a low cost pre-lithiated anode, a novel process is now disclosed.

For the purpose of this discussion, lithiation is the electrochemical introduction of lithium into and/or on a material (preferably an electrode, anode or a cathode) and includes:

electrochemically transporting ions of lithium into the material as in intercalation; electrochemically transporting lithium ions onto, e.g., an anode current collector surface as in plating; electrochemically transporting lithium ions into an alloy of, e.g., an anode metal as in alloying; and/or electrochemically transporting lithium ions into a surface layer of the material, e.g., an anode or cathode, e.g. an SEI layer. Plating refers to forming a layer of atoms onto the immediate surface of a substrate, usually a metal through an electrolytic process. Alloying refers to a plating process where lithium atoms wind up in a homogeneous mixture within the host substrate, such as with aluminum or tin. Intercalation refers to a process where lithium ions are inserted between planes of an anode host material such as carbon or silicon or a cathode material such as Nickel Magnesium Cobalt (NMC). In some instances within the description, lithiation, intercalation, lithium plating or alloying are used interchangeably. In each instance where lithiation with salt is discussed below, lithiation with a lithium halide salt is understood to be preferred. Additionally, it is possible to use other alkali metal halide salts or alkali metal salts in lieu of lithium salts to achieve alkaliation in each of the processes described herein.

By lithiating the material, e.g., anode or cathode, prior to battery assembly, a surplus of lithium is present that can support longer cycling life, initial losses due to SEI formation, cathode related alkali metal ion losses, and/or alkali metal free cathode material cycling needs. The lithiation method can be implemented on a continuous or batch basis. In one embodiment, a metal-intercalating material, such as carbon, graphite, tin oxide, and silicon, is coated onto a current collector of a conductive material such as copper, coated aluminum or carbon fiber, forming the intercalation-based anode. A bath containing a non-aqueous solvent such as, but not limited to gamma butyrolactone (GBL), and at least one dissolved lithium salt such as, but not limited to LiCl, contacts the anode. Other solvents can be used and preferably are selected to exhibit: adequate salt solubility; a suitable electrochemical window; good ionic conductivity; low temperature boiling point under high vacuum conditions (e.g. less than 130° C. at 1 mTorr) to reduce risk of solvent degradation; a differential boiling point from water (e.g. 25° C. minimum) to facilitate water separation; miscibility with other cyclic and linear solvents; and/or no propensity to attack typical anode binders. Other lithium salts can be used, preferably ones that produce easily managed byproducts, more preferably those that have gaseous byproducts. Preferably the salt should also exhibit low solubility in common linear solvents such as DMC so that the salt may be recovered and cleansed easily for reuse after lithiation. A sparging gas such as $CO_2$ or $SO_2$ can be added to the lithiation bath in order to: increase the lithium salt solubility; increase the ionic conductivity; improve the quality of the SEI layer; and/or increase the lithiation efficiency as has been discovered. Electrolytic field plates are provided. A reducing current is applied to the anode in such a way as to lithiate. At the field plate, there is an oxidizing current, so there is a need to use an inert material such as platinum, or carbon. In another preferred embodiment, the byproduct of the lithiation process is limited to an evolving gas at the counter electrode (field plate). The full complement of lithium ions is provided in this way. In another embodiment, a lithium non-interactive current collector may be plated using this method. In another embodiment, an alloying metal foil or coating may be lithiated in this method.

After lithiation, it may be desirable to reduce the amount of remaining salt or lithiation solvent in the anode. An additional step comprising a rinse with a solvent (such as GBL or DMC) but without the salt content to reduce the remaining salt content in the lithiated anode can be performed. In the case of cathode rinsing, the electrode may be electrically held in reduction during the rinse to prevent oxidation with chlorine. Alternately a pair of rollers can be used to remove excess surface fluids from the anode as it departs the lithiation tank. Alternately, the processed and rinsed material, e.g., anode or cathode, can be vacuumed dried, thereby removing the remaining solvent, making it capable of long-term storage and compatible with subsequent use in a normal battery assembly process.

The invention provides a method for lithiation of a material, e.g., an anode or cathode, preferably, in a continuous process, comprising the steps of:

(a) providing a material, e.g., an anode or cathode;

(b) providing a bath comprising a non-aqueous solvent and at least one dissolved lithium salt, preferably a lithium halide salt, such as lithium chloride, wherein said bath contacts the anode, preferably in a continuous process, and wherein a dry gas blankets said bath;

(c) providing an electrolytic field plate comprising an inert conductive material wherein said field plate establishes a field between the anode and the field plate; and (d) applying a reducing current to the anode and an oxidizing current to the field plate, wherein metal ions from the bath lithiate the material, e.g., the anode or cathode.

The invention also discloses a method for lithiating in a continuous process, wherein the lithiated material provides for the reduced irreversible capacity for the whole cell or provides for the whole amount of lithium necessary to operate a non lithium metal containing cathode material, comprising the steps of:

(a) providing a material, e.g. an anode or cathode, comprising a lithium active material, or an inactive substrate that can be plated;

(b) providing a bath comprising a non-aqueous solvent and at least one dissolved lithium halide salt, wherein said bath contacts the material, e.g. anode or cathode, in a continuous process, and wherein a dry gas blankets said non-aqueous solvent and at least one dissolved lithium halide salt;

(c) providing an electrolytic field plate, comprising an inert conductive material wherein said field plate establishes a field between the material, e.g. anode or cathode, and the field plate;

(d) applying a reducing current to the material, e.g., an anode or cathode, wherein metal ions will lithiate the material, e.g., anode or cathode, in a continuous process;

(e) applying an oxidizing current to the field plate; and (f) collecting an evolving gas or byproduct generated at the field plate.

In one embodiment, the anode material is selected from carbon, coke, graphite, tin, tin oxide, silicon, silicon oxide, aluminum, lithium-active metals, alloying metal materials, and mixtures thereof, wherein said material is coated onto a current collector of a conductive material selected from copper or aluminum respectively or carbon fiber.

In a further embodiment, the non-aqueous solvent is selected from butylene carbonate, propylene carbonate, ethylene carbonate, vinylene carbonate, vinyl ethylene carbonate, dimethyl carbonate, diethyl carbonate, dipropyl carbonate, methyl ethyl carbonate, acetonitrile, gamma-butyrolactone, room temperature ionic liquids, and mixtures thereof. In a preferred embodiment, the non-aqueous solvent is gamma-butyrolactone.

In another embodiment, the halide salt is that of Na or K. In another embodiment, the lithium containing salt is LiNO$_3$. In yet another embodiment, the lithium halide salt is selected from LiCl, LiBr, LiF, and mixtures thereof. In a preferred embodiment, the lithium halide salt is LiCl.

In yet another embodiment, the non-aqueous solvent contains an additive that facilitates the formation of a high quality SEI layer. For example, VC, EC or maleic anhydride could be added to the non-aqueous solvent.

In yet another embodiment, a sparged gas such as CO$_2$ or SO$_2$ is incorporated into the lithiation bath in order to: increase the salt solubility, increase the ionic conductivity, support good quality SEI in the form of Li$_2$CO$_3$ or Li$_2$SO$_3$, and increase the efficiency of the intercalation. The sparged gas is bubbled to create up to atmospheric pressure saturation. Higher levels of saturation are also beneficial, but this level of gas saturation is sufficient to increase the efficiency of lithiation. CO$_2$ is preferred because of its lower cost and lower toxicity. Samples of graphite anodes were pre-lithiated to 1 mAhr/cm$^2$ in the described method but with and without bath CO$_2$ saturation. The resulting anodes were delithiated against a lithium metal counter electrode in a quartz beaker to +1 volt above lithium metal to determine the reversible lithium content. In all cases, the reversible lithium amount was greater in the CO$_2$ examples than those without CO$_2$. FIG. 9 shows the improvement of the lithiation process when CO$_2$ is sparged into the lithiation process tank. This represents a significant improvement to any commercial application of pre-lithiation.

In each instance where lithium, lithium salts and/or lithiation are discussed below/above, it is understood that other alkali metals and alkali salts can be used and alkaliation can be achieved.

Figure 1:
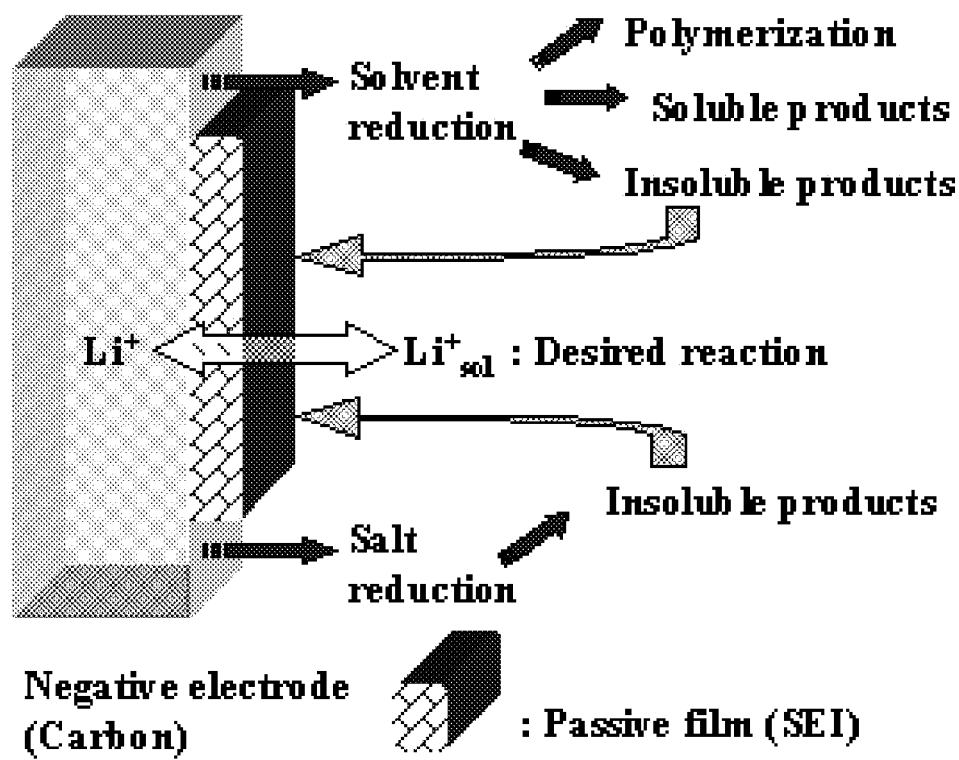
FIG. 1: Characterization of the SEI layer on carbon negative electrode (anode).

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Anodes comprised of metal oxides or metal alloys or graphite or carbon or silicon or silicon/carbon blends, such as anodes comprised of graphite or carbon, are lithiated during the first charging step in the battery operation after assembly, with lithium coming from the cathode material. In these cases, the cathode is the heaviest and most expensive component in the battery. It would therefore be desirable and of commercial importance to reduce the weight of the cathode, with minimal loss to the battery efficiency and output. If the dead weight that results from SEI and cathode passivation layer formation could be eliminated by sourcing the metal ions in such a way that alleviated the effects of the irreversible losses of the metal ions, then the specific capacity and volumetric capacity density of the battery could be increased, and cost of the battery could be reduced. In some cases, it may be beneficial to place an amount of lithium into the cathode that is slightly above the as produced stoichiometric value. The present invention relates to a method for lithiation of an intercalation-based material, such as an anode or cathode, a non-reactive plating-capable foil, or an alloying capable film or foil whereby utilization of said lithiated material e.g., an anode or cathode, in a rechargeable battery or electrochemical cell results in an increased amount of lithium available for cycling, and an improved reversible capacity during charge and discharge. The additional lithium available may also support the cycling of an initially non-lithium-containing cathode material. Alternately, an initially non lithium containing cathode material such as sulfur can be lithiated directly prior to assembly. As mentioned above, anodes comprised of graphite or carbon or silicon or silicon-carbon blends have been lithiated during the first charging step in the battery operation after assembly, with lithium coming from the cathode material. In these cases, the cathode is the heaviest and most expensive component in the battery. One of the desired features in lithium battery technology is to reduce the weight of the battery coming from the excess cathode material, without compromising battery efficiency and output.

Figure 2:
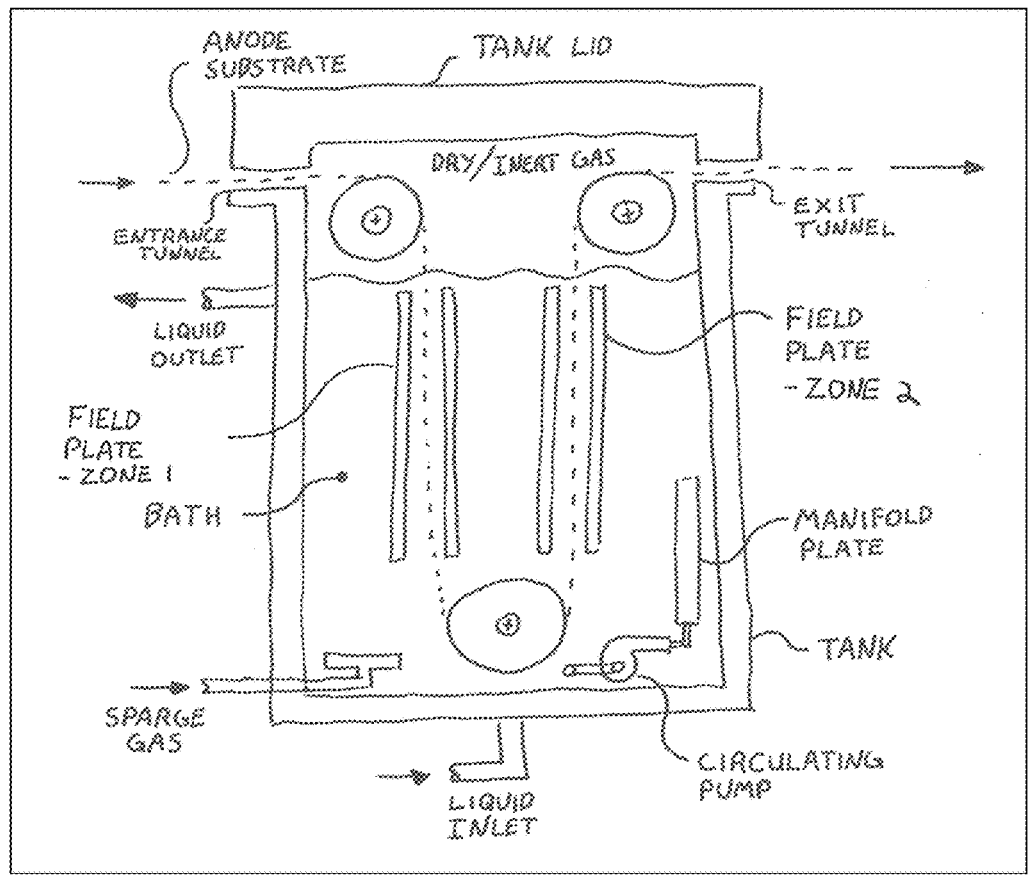
FIG. 2: Lithiation tank layout.
Figure 3:
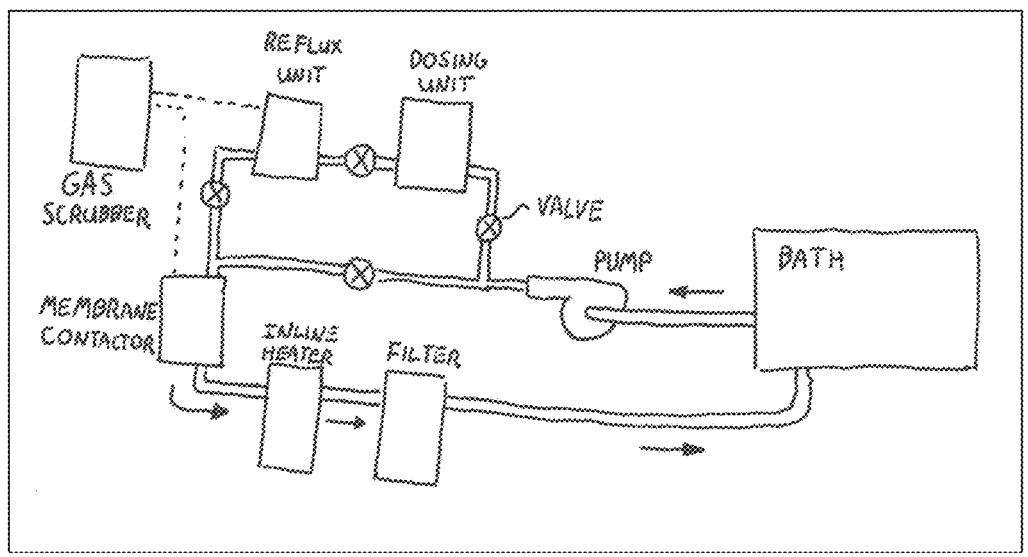
FIG. 3: Lithiation system layout with a solvent conditioning system and salt replenishment system.
Figure 4:
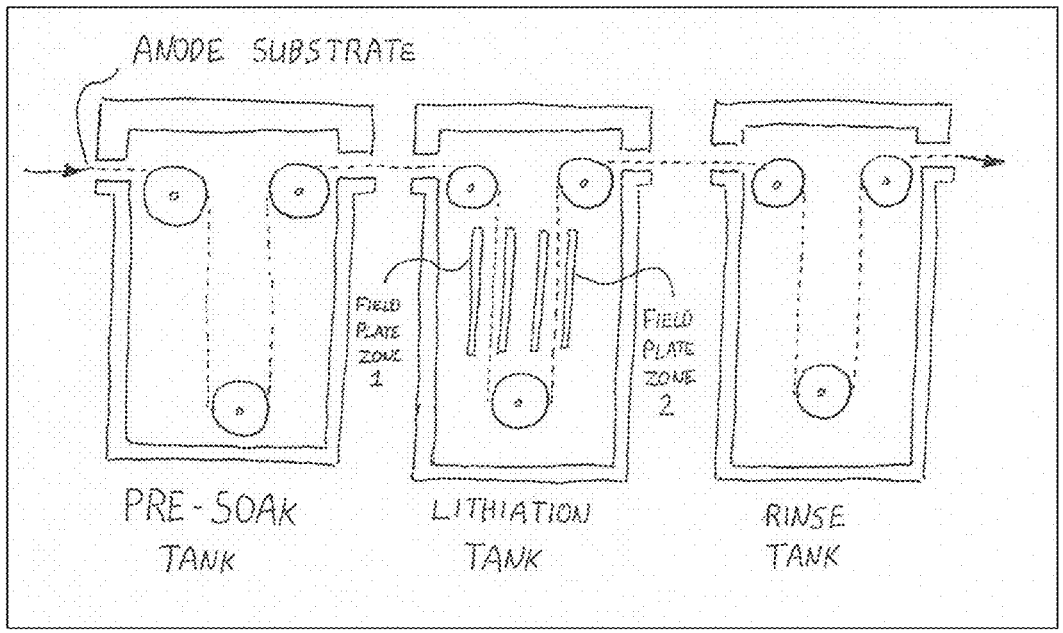
FIG. 4: Multi-tank lithiation layout.

A method for fabricating a lithiated material, e.g., an anode or cathode, which provides increased amounts of lithium available for cycling, improved reversible capacity during charge and discharge of a rechargeable battery and a consequent lighter battery is disclosed in FIG. 2. Electrolytic field plates are held at a voltage necessary to establish a field between the anode or cathode and the field plate, and to lithiate the anode, such as to plate or intercalate lithium onto a foil, or into an anode or cathode substrate or sheet, or to form an SEI layer upon the anode or cathode. A typical operating voltage for this is 4.1V. An appropriate reference electrode, such as Ag/AgNO$_3$ non-aqueous reference from Bioanalytical Systems, Inc., located close to the targeted negative electrode may be preferred to monitor the anode or cathode conditions. It is possible to operate the field plates in either voltage or current control mode. With current control, the full operating potential may not be immediately obtained. This operation under current control may result in lower initial operating voltages. This lower voltage may prefer secondary side reactions instead of the dissociation of the lithium halide salt (e.g. LiCl) and the resulting intercalation of the anode material. Operating under voltage control can ensure that the field plate potential is immediately set to a sufficient potential to favor the dissociation of the lithium halide salt (e.g. 4.1 Volt for LiCl) and to minimize secondary side reactions. Current control can alternatively be used if the subsequent operating voltage remains above the lithium halide salt dissociation threshold. This can be done by setting a sufficiently high initial current density (e.g. 2 mA/cm$^2$) that will favor the dissociation rather than secondary side reactions. An oxidizing current is applied at the field plate, so there is a need to use an inert material or a conductive oxide. In one embodiment, the inert material comprising the field plate is selected from glassy carbon, tantalum, gold, platinum, silver, and rhodium. In a preferred embodiment, the inert material comprising the field plate is selected from platinum, gold or carbon. In a more preferred embodiment, the inert material comprising the field plate is carbon or glassy carbon. The field plates may also be comprised of a base material such as stainless steel that is plated with an inert conductive material such as gold, platinum, or glassy carbon. The field plates are immersed within the bath, with the anode passing between the field plates as illustrated in FIGS. 2 and 4. The field plates can be operated as a single entity at a single controlled voltage or current density, or multiple plates can be implemented that allow for independent control of voltage or current density over multiple zones. This is illustrated in FIGS. 2 and 4.

Figure 9:
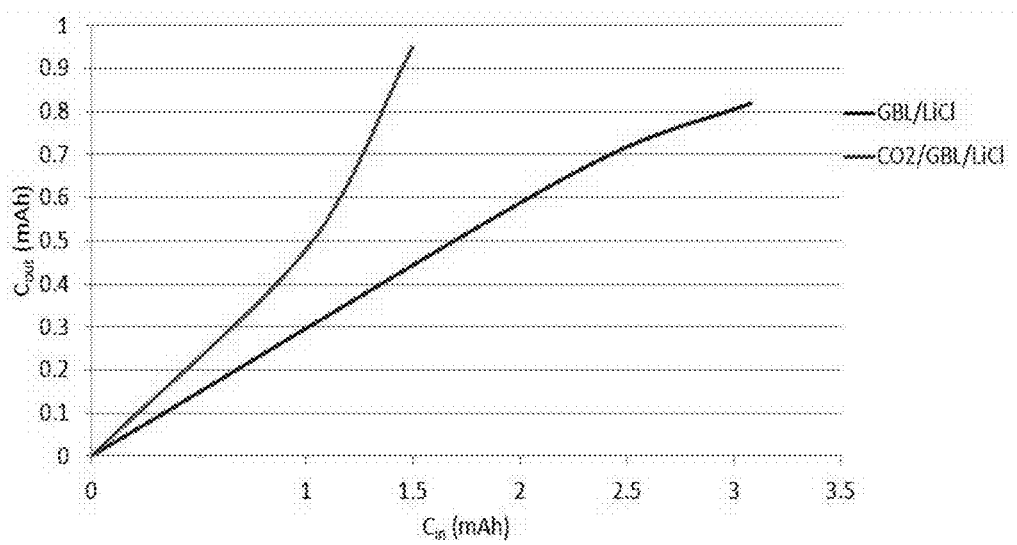
FIG. 9: Lithium intercalation efficiency with CO$_2$ and without CO$_2$.

The anode typically comprises a compatible anodic material which is any material which functions as an anode in an electrolytic cell. As herein disclosed, the term anode is equivalent to the terms negative electrode, conductive foil, anode sheet, anode substrate, or non-reactive plating-capable foil. In one embodiment, anodes are lithium-intercalating anodes. Examples of materials that comprise lithium-intercalating anodes include but are not limited to carbon, graphite, tin oxide, silicon, silicon oxide, polyvinylidene difluoride (PVDF) binder, and mixtures thereof. In a further embodiment, lithium-intercalating anode materials are selected from graphite, cokes, mesocarbons, carbon nanowires, carbon fibers, silicon nanoparticles or other metal nanomaterials and mixtures thereof. In another embodiment, alloying metals such as tin or aluminum may be used to host the lithium metal as a result of the lithiation. A cathode is a substance typically coated on a current collector that gives up lithium ions and electrons during the charging step of an electrochemical cell. Examples of these cathode materials include but are not limited to LiFePO$_4$, LiMn$_2$O$_4$ etc. A reducing current is applied to the electrode in such a way as to intercalate the lithium. The anode or cathode is bathed in a solution comprising a non-aqueous solvent and at least one dissolved lithium salt. The term non-aqueous solvent is a low molecular weight organic solvent added to an electrolyte which serves the purpose of solvating the inorganic ion salt. Typical examples of a non-aqueous solvents are butylene carbonate, propylene carbonate, ethylene carbonate, vinylene carbonate, vinyl ethylene carbonate, dimethyl carbonate, diethyl carbonate, dipropyl carbonate, methyl ethyl carbonate, acetonitrile, gamma-butyrolactone, triglyme, tetraglyme, dimethylsulfoxide, dioxolane, sulfolane, room temperature ionic liquids (RTIL) and mixtures thereof. In one embodiment, a non-aqueous solvent is selected from ethylene carbonate, vinylene carbonate, vinyl ethylene carbonate, gamma-butyrolactone, and mixtures thereof. In a second embodiment, a non-aqueous solvent is gamma-butyrolactone. In a third embodiment, an additive can be introduced to support high quality SEI formation. The additive could be vinylene carbonate, ethylene carbonate or maleic anhydride. In a fourth embodiment, a gas such as CO$_2$ or SO$_2$ is sparged into the non-aqueous solution in order to: increase salt solubility; increase the ionic conductivity; support the formation of a Li$_2$CO$_3$ or Li$_2$SO$_3$ SEI layer; and increase the lithiation efficiency. FIG. 9 describes the efficiency of reversible lithium intercalation from an initial amount of lithium sourcing measured in mAhr. The lost amount can be described as side reactions such as but not limited to SEI formation.

The term alkali metal salt refers to an inorganic salt which is suitable for use in a non-aqueous solvent. Examples of suitable alkali metal cations comprising an alkali metal salt are those selected from Li$^+$, Na$^+$, K$^+$, Rb$^+$, Cs$^+$, Fr$^+$, and mixtures thereof. Examples of suitable halogen anions comprising an alkali metal salt are those selected from F$^-$, Cl$^-$, Br$^-$, I$^-$, and mixtures thereof. In one embodiment, the alkali metal salt is selected from LiF, LiCl, LiBr, NaF, NaCl, NaBr, KF, KCl, KBr, and mixtures thereof. Other salts such as LiNO$_3$ may be used, but in the preferred embodiment, the alkali metal salt is the halide LiCl.

Inexpensive salts with gaseous decomposition products can be halides such as LiCl, LiBr, and LiF. LiCl and other simple salts can be difficult to dissolve or ionize in non-aqueous solvents. Solvents such as propylene carbonate (PC), dimethyl carbonate (DMC), and acetonitrile support only trace amounts of LiCl in solution without the use of a complexing agent such as AlCl$_3$. AlCl$_3$ and other complexing agents can be difficult to handle in regard to moisture management and high corrosivity. In addition, some solvents that can dissolve halide salts, such DMSO or tetrahydrofuran (THF), do not allow complete ionization of the salt, and/or attack the binding polymers in the anode composites. Gamma-butyrolactone has been found to facilitate the dissolution and ionization of the desirable alkali metal halide salts. It combines good solubility of the alkali metal halide salts with compatibility with TFE Teflon$_c$, PVDF, butadiene rubber and other binders. The use of halide salts with gaseous decomposition products such as LiCl prevents the production of solid precipitates during the lithiation process. Since the lithiation process products are primarily lithium ions and gas, there are few solid precipitates or intermediate compounds that can accumulate in the non-aqueous solvent solution. Removal of dissolved gas from the non-aqueous solvent solution is preferred over solid precipitates during long term continuous operation of a production system.

Gamma-butyrolactone also has a capable electrochemical window, including the lithium potential near −3 volts vs. a standard hydrogen electrode (SHE). It is a capable electrolyte with high permittivity and low freezing point, and can dissolve and ionize up to a 1 M concentration of LiCl. A modest amount of heat can be used to reach this value. In one embodiment, the heat to dissolve and ionize up to a 1 M concentration of LiCl is between about 30° C. and 65° C. In a more preferred embodiment, the heat is between about 38° C. and 55° C. In a most preferred embodiment, the heat is about 45° C. The lithiation tank can also have an internal circulating pump and distribution manifold to prevent localized salt concentration deprivation.

Figure 8:
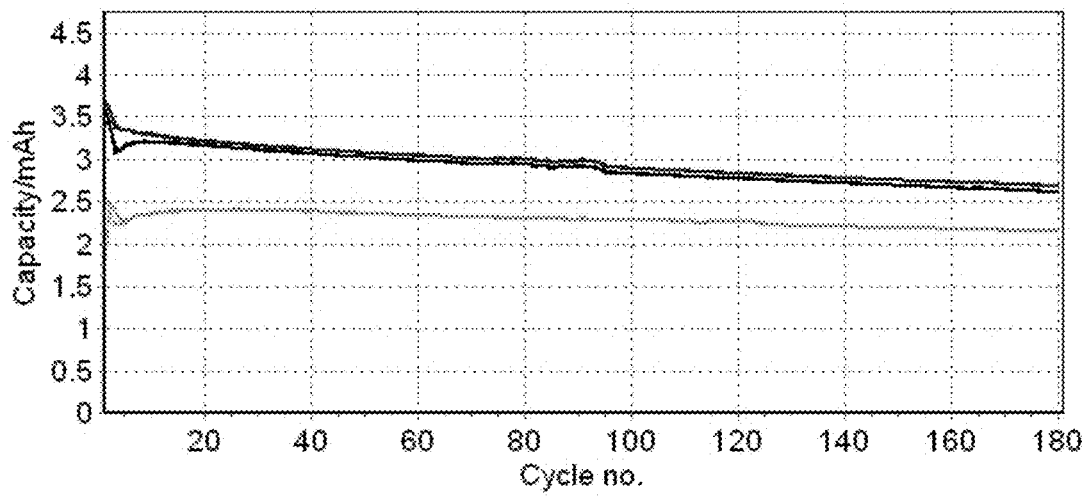
FIG. 8: Cell capacity comparison of LiCoO$_2$/graphite control versus pre-lithiated button cell.
Figure 10:
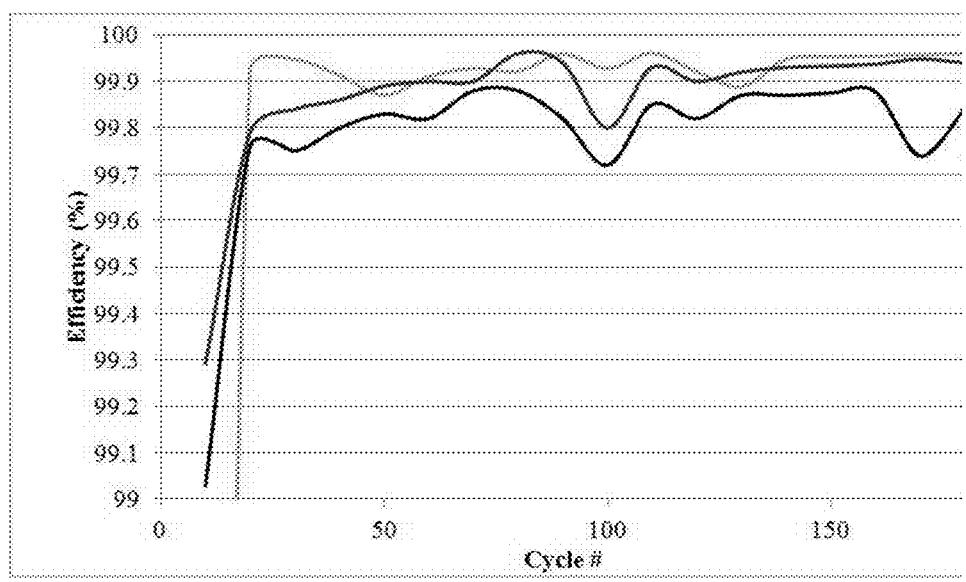
FIG. 10: Coulombic efficiency of pre-lithiated and control sample cells.

It has been discovered here that a dissolved gas such as CO$_2$ or SO$_2$ can enhance the lithiation process. It increases the solubility of the salt, the ionic conductivity of the non-aqueous solvent, and doubles the efficiency of lithiation. Since CO$_2$ is inexpensive, easily dried, chemically safe, and a potential building block gas for a high quality SEI layer, it has been selected as the preferred dissolved gas. CO$_2$ preferentially reacts with trace H$_2$O and Li$^+$ during the lithiation process to form a stable, insoluble SEI material (Li$_2$O, Li$_2$CO$_3$ etc.). FIGS. 8 and 10 exemplify the operating efficiency of the LiCoO$_2$/graphite cells with and without pre-lithiation. The moisture level in the lithiation tank is driven down by the consumption of CO$_2$ and H$_2$O according to this process, and care is given to control the moisture level in the tank to between about 5 to 20 ppm (see FIG. 2). In this way, anode lithiation with a quality SEI material is produced continuously.

The intercalation or plating process for lithium ions (or generally lithiation) from 1 M LiCl salt in gamma-butyrolactone solvent will occur at about 4.1 volts measured between the anode sheet and the reference electrode up to a reducing current density of 2 $mA/cm^2$ or more. As intercalation rates are increased too far beyond this current density, dendrites or lithium plating may begin to take place which harm the final battery or electrochemical cell performance. This will vary depending on the graphite porosity etc. In order to control both the currents and dependant voltages accurately, it may be necessary to divide the field plate into zones as shown in the FIGS. 2 and 4. Other metals can also be plated or intercalated with this method including sodium as an example. As mentioned above, the byproduct of the intercalation process when using a halide alkali metal salt is an evolving gas at the counter electrode (field plate). In a preferred embodiment, the evolving gas is selected from $F_2$, $Cl_2$, $Br_2$, and mixtures thereof. In a more preferred embodiment, the evolving gas is $Cl_2$.

Prior to entering the lithiation bath, the anode or cathode material can be pre-soaked in an electrolyte solution as shown in FIG. 4. The pre-soaking of the material will ensure full wetting of the material prior to the start of the lithiation process. This pre-soak bath can contain a non-aqueous solvent with or without a lithium salt, with or without a sparge gas, and with or without an SEI promoting additive.

The evolution of gas at the field plate or counter electrode can result in evolving gas entering into, and/or being released from, the bath solution. As a result, controlling the build-up of dissolved and released gas is desired to avoid corrosion, as for example, in the hypothetical case of trace water contamination reacting with chlorine gas, to form HCl during chlorine gas evolution. The tank assembly can be configured to control the introduction of moisture into the system by using a dry gas blanket on top of the liquid. In one embodiment, the dry gas (1-10 ppm moisture) is selected from helium (He), neon (Ne), argon (Ar), krypton (Kr), xenon (Xe), sulfur hexafluoride ($SF_6$), nitrogen ($N_2$), dry air, carbon dioxide ($CO_2$) and mixtures thereof. In a preferred embodiment, the dry gas is selected from nitrogen, argon, carbon dioxide, dry air and mixtures thereof. Moisture ingress can also be controlled by having a long narrow gap entry and exit tunnel for the anode film where a counter flowing dry gas is used to mitigate air entry into the system.

FIGS. 2, 3, 4 and 7 illustrate a process and apparatus that continuously controls moisture, gas, and small quantities of lithiated organic compounds during a continuous lithiation process. Liquid is drawn from a bath through a series of valves. The liquid can be delivered in a batch mode to a refluxing unit, or it can be continuously circulated through a conditioning loop including distillation or reverse osmosis. The reflux unit can take batches of material through a vacuum refluxing process that will remove both accumulated gas as well as moisture from the liquid. In one embodiment, the accumulated gas is selected from $F_2$, $Cl_2$, $Br_2$, and mixtures thereof. In a more preferred embodiment, the accumulated gas is $Cl_2$. The use of reflux conditioning instead of a distillation process can prevent a change in the salt concentration of the working fluid which would result in a loss of salt content through precipitation. Once the batch liquid has been refluxed for a designated period of time, the liquid can be returned to the bath with a lower moisture and gas content. The size and rate of the reflux unit can be matched to the moisture ingress rate and to the gas production rate in order keep the bath liquid at optimum conditions. The reflux rate can be increased through use of multiple simultaneous batches and through the use of high rate reflux equipment such as a rotary evaporator and high vacuum conditions. The reflux batch moisture content typically decays in an exponential fashion and the turnover rate can be tuned for optimal moisture control with minimal energy input and equipment cost.

The refluxing unit can be placed after a salt dosing unit. The salt dosing unit can be used to add and mix the desired salt into the non-aqueous solvent solution. The temperature of the dosing unit can be held to maximize the solubility of the salt in the electrolyte and the elevated temperature can also be used as a pre-heating step for the refluxing unit. In one embodiment, the dosing unit maintains an elevated process temperature of between about 30° C. and 65° C. In a more preferred embodiment, the dosing unit maintains an elevated process temperature of between about 38° C. and 55° C. In a most preferred embodiment, the dosing unit maintains an elevated process temperature of about 45° C. The benefit of dosing in the salt in a dosing unit before the refluxing unit is that the salt does not have to be in a completely dry state. Removing the moisture from a solid phase salt can be very difficult. Once a salt is dissolved into solution, however, the water content of the salt can be removed through the refluxing process. Maintaining the dosing unit at an elevated temperature increases the solubility of the lithium salt in the non-aqueous solvent and ensures full dissolution of the salt prior to the refluxing unit.

The conditioning/replenishment loop operates in a continuous mode and can also be used to remove dissolved gases from the bath liquid through use of a membrane contactor. The gas output from the membrane contactor and the reflux unit can be passed through a scrubber to capture any effluent, such as chlorine gas, produced by the process. In one embodiment, the dissolved gases are selected from $F_2$, $Cl_2$, $Br_2$, and mixtures thereof. In a more preferred embodiment, the dissolved gas is $Cl_2$. The bath liquid can also be paired against either vacuum or a dry gas within the membrane contactor in order to remove unwanted gases. In one embodiment, the dry gas is selected from helium (He), neon (Ne), argon (Ar), krypton (Kr), xenon (Xe), sulfur hexafluoride ($SF_6$) nitrogen ($N_2$), carbon dioxide ($CO_2$), dry air and mixtures thereof. In a preferred embodiment, the dry gas is selected from nitrogen, argon, carbon dioxide, dry air and mixtures thereof.

An inline heater can be used to maintain an elevated tank temperature to maintain consistent bath operating conditions, even with variations in facility temperature. Elevated lithiation tank temperatures can aid in the formation of a high quality SEI layer. In one embodiment, the inline heater maintains an elevated tank temperature of between about 30° C. and 55° C. In a more preferred embodiment, the inline heater maintains an elevated tank temperature of between about 30° C. and 45° C. In a most preferred embodiment, the inline heater maintains an elevated tank temperature of about 40° C.

A filter unit can be used to remove any accumulated particulate contamination. The filter unit can be located at various points in the loop including prior to the pump and after the salt dosing unit. The filter unit can be used to remove particulates from the non-aqueous solvent in cases where a non-halide lithium salt such as $LiNO_3$ is used such that a precipitate is formed at the field plates.

Lithium halide salt can be added to the non-aqueous solvent using the salt dosing unit. An excess of solid lithium salt can be maintained within the dosing unit to keep the lithium salt concentration within the loop and within the bath at the desired level (i.e., a saturated solution of about 0.5 M to 1.0 M) over long periods of time. The dosing unit can be configured to keep the solid salt from entering the bath or refluxing unit. By dosing salt prior to the refluxing unit, there is no need to separately dry the salt with its high water binding energy in its granular state. In one embodiment, the lithium salt within the salt dosing unit is selected from LiF, LiCl, LiBr, and mixtures thereof. In a preferred embodiment, the lithium halide salt within the salt dosing unit is LiCl. Dissolved lithium salts can be carried through the rest of the loop. The fluid circulation loop pump rate can be matched to maintain a constant lithium salt concentration in the tank. For a given anode or cathode substrate process rate, a matching loop circulation rate will dose the same amount of lithium salt as the lithiation process consumes. As the anode or cathode process rate is increased or decreased, the loop circulation rate can be modified to maintain an equilibrium state within the bath.

Depending on the specific tank conditions, the bath fluid can be treated using a circulating loop, a refluxing unit or a distillation unit as shown in FIGS. 2 and 4. A circulating loop can dose in salt, remove dissolved gases, control the bath temperature and removed particulate contaminants. A refluxing unit is effective at removing dissolved gases and for removing moisture content without reducing the salt content of the solution. A distillation unit is effective at removing dissolved gases, removing moisture content, removing all salt content and removing lithiated organic compounds. The output from the distillation unit can be fed back into a dosing and refluxing unit to reestablish the salt content if required. The effluent from the distillation unit can be collected and treated to recover used salt for reuse in the lithiation process. For example, DMC solvent will rinse away all but the insoluble salt so that the salt may be re-introduced into the dosing unit. Recirculating loops, refluxing unit and distillation units can be shared across multiple tanks that have different input and output requirements as a means of minimizing equipment size and cost.

When the anode is lithiated to the extent of the irreversible and extended cyclic loss amount, it can be assembled into a rechargeable battery or electrochemical cell with a smaller amount of lithium-bearing cathode material than would otherwise be required, thereby improving the specific capacity, specific energy, volumetric capacity density and volumetric energy density of the cell while reducing its cost. Alternately, a cathode can be pre-lithiated to or above the normal stoichiometric value to supply excess lithium to the forming cell.

When the anode is lithiated to the extent of the irreversible and extended cyclic loss amount, as well as the intended cycling amount, it can be assembled into a battery or electrochemical cell with a cathode material that does not initially contain lithium. This type of cathode material can be much less expensive than lithium containing cathode materials, and examples include, but are not limited to, $MnO_2$, $V_2O_5$ and polyaniline. Alternatively, the cathode itself may be pre-lithiated prior to assembly. The cost of the battery or cell produced with this method will be lower due to the lower cost of the feedstock lithium salt.

Therefore, previous limitations to the low cost production of more efficient lithium ion batteries and electrochemical cells are overcome by the novel processes described here. The materials and processes of the present invention will be better understood in connection with the following examples, which are intended as an illustration only and not limiting of the scope of the invention.

EXAMPLES

The following is a detailed example of an anode preparation and processing. 25 micron thick copper foil was cleaned with isopropyl alcohol and Kimberly-Clark Kimwipes to remove oil and debris and then dried in air. A solution was prepared by adding 2.1 grams of 1,000,000 weight PVDF powder from Arkema Fluoropolymers Div. to 95 ml of dry NMP solvent from Aldrich Chemical. The solution was mixed with a stir bar overnight to fully dissolve the PVDF material. The solution was kept in the dark to prevent the light sensitive solvent from reacting. 33.9 ml of this PVDF solution was then added to 15 grams of Conoco Philips CPreme G5 graphite and 0.33 grams of acetylene black and stirred for 2 hours in a ball mill at 600 RPM without any mixing balls. The resulting slurry was cast onto the copper foil using a vacuum hold down plate with heating capability. The finished graphite thickness after casting and drying at 120° C. was about 100 microns or 14 mg/cm$_2$. The anode sheet was then die punched into 15 mm diameter discs and then pressed at about 3000 psi and 120° C. for use in a 2032 button cell assembly. The copper/graphite anode discs were then vacuum baked at 125° C. and about 1 mTorr in a National Appliance Company model 5851 vacuum oven for at least 12 hours.

The anode discs were then transferred into a Terra Universal dry air glove box with −65° C. dew point air supplied by compressed dry air passed through a Kaeser two stage regenerative drier. The anode discs were then vacuum infiltrated with a GBL solvent with a 0.5 M concentration of LiCl salt solution. This electrolyte solution had been prepared by heating to 90° C. and then vacuum refluxing at about 1 mTorr for 6 hours to remove moisture down to about 10 ppm. The anode discs were allowed to soak for a half hour at vacuum conditions, a half hour in atmospheric pressure conditions and a half hour in the lithiation vessel itself prior to any currents being passed. The lithiation vessel included a constant bubbling of $CO_2$ gas to achieve a saturation level and a temperature of 30° C. Test leads from a Maccor 4300 battery tester were connected to the anode sample (red working) and glassy carbon (black counter) electrode. Voltage at the working electrode is monitored via a $Ag/AgNO_3$ non-aqueous electrode. A reducing current of 2 mA/cm$^2$ was applied to the graphite anode until a total of 1 mAhr/cm$^2$ was achieved. The pre-lithiated anode disc was then rinsed in pure distilled GBL and vacuum dried. The anode discs were then assembled against either $LiFePO_4$ or LiCoO2 12 mm diameter cathode discs. The separator used was Celguard 2400, and about 0.2 ml of electrolyte was used in the assembly. The electrolyte was 1:1:1 EC:DMC:DEC with 1M $LiPF_6$ salt and 1% VC with moisture levels at about 10 ppm. A vacuum was applied to the assembled cell to remove bubbles before crimping in an MTI model MT-160D crimping tool. Subsequent electrical tests were then performed on the battery tester unit using a 12 hour delay, two about C/12 formation cycles to at least 3.7 volts, about C/3 charge/discharge cycles, and 20 minute rest steps between them. All the battery tests were carried out in a home-made environmental chamber controlled to 26° C.

Figure 5:
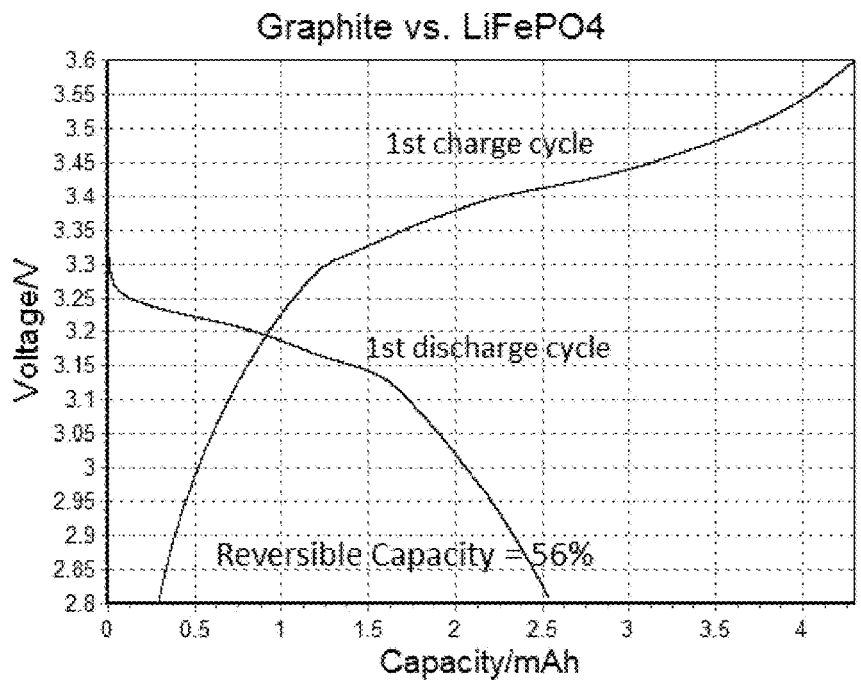
FIG. 5: First charge and discharge of a standard anode versus LiFePO4 cathode.
Figure 6:
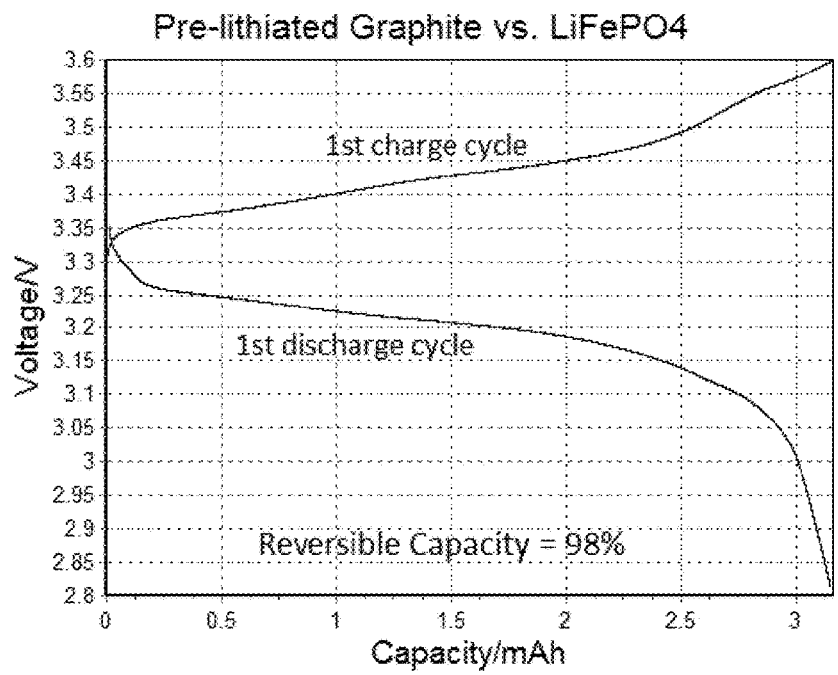
FIG. 6: First charge and discharge of a pre-lithiated anode versus LiFePO4 cathode.
Figure 7:
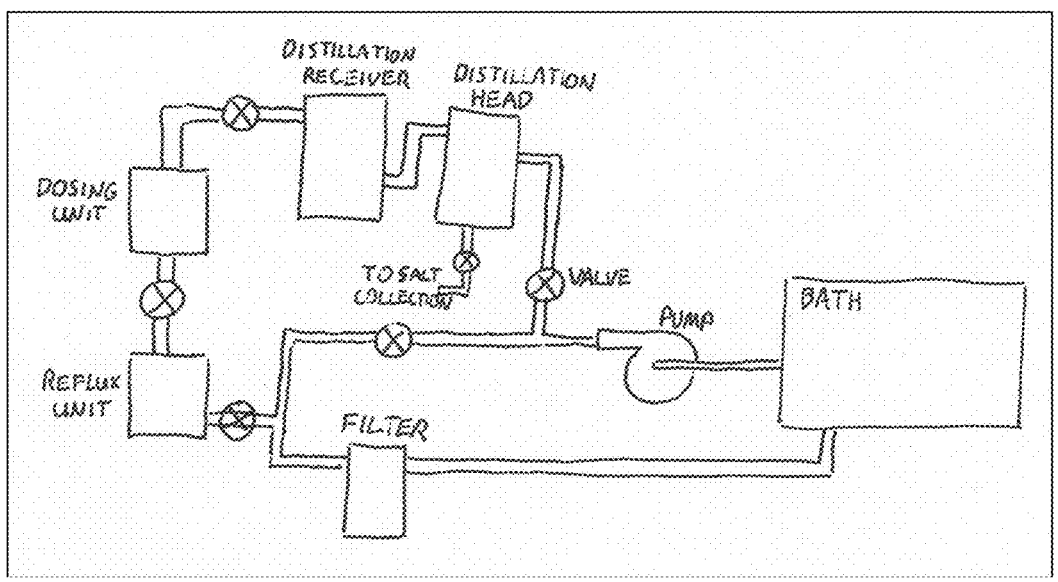
FIG. 7: Lithiation system layout with a solvent conditioning system, solvent distillation system, and salt replenishment system.
Figure 11:
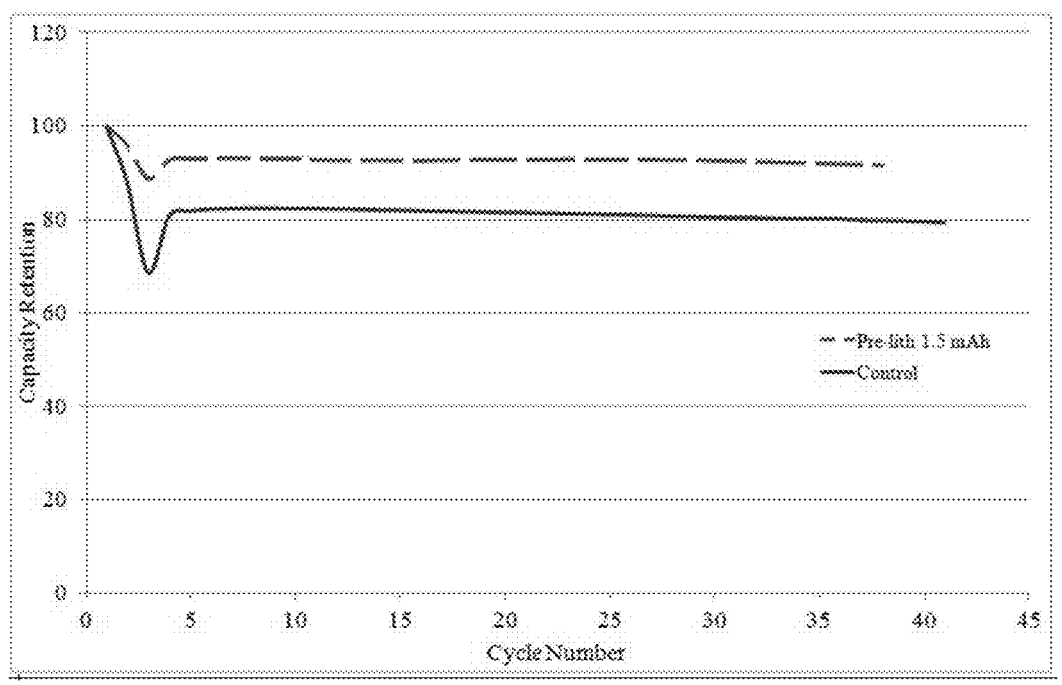
FIG. 11: Comparative heat test results of pre-lithiated and control sample cells.

A Maccor model 4300 battery tester was used to test the CR2032 size button cells assembled with a CPreme graphite anodes, $LiFePO_4$ or $LiCoO_2$ cathodes, and Celguard 2400 separators. Electrolyte solutions containing a 1:1:1 mixture of EC:DMC:DEC with 1 molar concentration of LiPF6 salt and 1% VC were used. Both anodes and cathodes were cast with PVDF binders. First charge and discharge cycles, often called the formation cycles, were performed at a current rate of approximately C/12. FIGS. 5 and 6 illustrate the first cycle irreversible loss using pre-lithiated and non-pre-lithiated graphite anodes mounted against $LiFePO_4$ cathodes. The initial absolute charge capacity of the two samples is different due to extraneous packaging variation. The irreversible losses are representative of the methods described, however. In FIG. 5, the reversible capacity of the button cell is 56%. In FIG. 6, the reversible capacity of the button cell when matched to a pre-lithiated anode is 98%. FIG. 8 shows a typical $LiCoO_2$/graphite vs. a $LiCoO_2$/pre-lithiated graphite, but otherwise identical sample, tested over an extended range of charges and discharge cycles at approximately a C/3 rate. The results indicate that there is a long lasting benefit to the battery cell due to pre-lithiation using the methods described. FIG. 11 shows the effectiveness of the SEI layer formed during the prelithiation process, by comparing capacity retention of the cell with prelithiated anode to a control cell, with both cells being subjected to 48 hours of 50° C. heat as a form of accelerated aging test.

Example 2

An NMC cathode is mounted in a half cell containing lithium metal as the negative electrode. The NMC cathode is "charged" to liberate most of its lithium content. This cell is disassembled and the cathode taken out to use as an electrode in the pre-lithiation apparatus that includes the above mentioned GBL and LiCL salt solution including $CO2$ gas. The NMC cathode is subjected to a reducing current of 1 mA/cm2 with a total dosage of 1 mAhr/cm2. The cathode is then rinsed while held in a small reducing current (0.1 mA/cm2) to inhibit chemical oxidation and then vacuum dried. The cathode is then mounted into a half cell as described earlier and cycled starting with the "charge" step to measure the amount of cycleable lithium that is present. The amount of cycleable lithium can be measured. After the charge step is completed, normal cycling can be performed at a rate of C/3 between 4.2 volts and 3.0 volts. The half cell capacity can be determined.

An example of a salt other than LiCl that has been used by the inventor to achieve lithiation is $LiNO_3$. Reasonable rates of lithiation have been achieved with $LiNO_3$. When the anodes pre-lithiated using $LiNO_3$ were paired with $LiFePO_4$ cathodes, however, poor cycling resulted, possibly due to an unidentified byproduct. This problem can be solved by a slightly more complicated removal process such as an additional anode rinse.

While there has been illustrated and described what is at present considered to be the preferred embodiment of the present invention, it will be understood by those skilled in the art that various changes and modifications may be made and equivalents may be substituted for elements thereof without departing from the true scope of the invention. Therefore, it is intended that this invention not be limited to the particular embodiment disclosed, but that the invention will include all embodiments falling within the scope of the appended claims.

What is claimed is:

1. A method for pre-lithiation of a material comprising the steps of:
   (a) providing a material;
   (b) providing a bath comprising gamma-butyrolactone and at least one dissolved lithium halide salt, wherein said bath contacts the material and wherein a dry gas blanket covers said bath;
   (c) providing an electrolytic field plate comprising an inert conductive material wherein said field plate establishes a field between the material and the field plate;
   (d) applying a reducing current to the material and an oxidizing current to the field plate, wherein lithium ions from the bath lithiate into the material;
   (e) rinsing the lithiated material produced by step (d); and
   (f) assembling a rechargeable battery with the lithiated material.

2. The method of claim 1, wherein the material is an anode active material selected from carbon, coke, graphite, tin, tin oxide, silicon, silicon oxide, aluminum, lithium-active metals, alloying metal materials, composites and mixtures thereof.

3. The method of claim 1, wherein the halogen of the dissolved lithium halide salt is selected from ionic $F^-$, $Cl^-$, $Br^-$, $I^-$ and mixtures thereof.

4. The method of claim 1, wherein the dissolved lithium halide salt is LiCl.

5. The method of claim 1, wherein the dissolved lithium halide salt is LiBr.

6. The method of claim 1, wherein the dissolved lithium halide salt is LiF.

7. The method of claim 1, wherein the electrolytic field plate is selected from platinum, gold, glassy carbon, and graphite.

8. The method of claim 1, wherein evolving gas generated at the field plate is captured by a reflux unit, a membrane contactor, a gas scrubber, or combinations thereof.

9. The method of claim 1, comprising one or more inline heaters.

10. The method of claim 9, wherein said inline heaters heat the gamma-butyrolactone and dissolved lithium halide salt to a temperature of between 30° C. and 65° C.

11. The method of claim 10, wherein said temperature is about 40° C.

12. The method of claim 1, wherein a separate immersion bath is used to rinse the material in a solvent while holding the field plate in a reducing current mode.

13. A method of claim 1, wherein lithium halide salt is recovered periodically by distillation of the used gamma-butyrolactone and subsequent rinsing of the salt in a light non-solvating fluid.

14. The method of claim 1, wherein the process is continuous.

15. The method of claim 1, wherein the gamma-butyrolactone contains an additive to facilitate high quality SEI formation.

16. The method of claim 15, wherein the additive is vinylene carbonate.

17. The method of claim 1, wherein a dissolved gas is added.

18. The method of claim 17, in which the dissolved gas is carbon dioxide.

* * * * *